Aug. 29, 1939.   W. BOXAN   2,171,469
AUTOMOBILE
Filed April 6, 1937

Inventor:
W. Boxan
By: Glascock Downing & Seebold
Attys.

Patented Aug. 29, 1939

2,171,469

UNITED STATES PATENT OFFICE 2,171,469

AUTOMOBILE

Walter Boxan, Chemnitz, Germany, assignor to Auto Union Aktiengesellschaft, Chemnitz, Germany Application April 6, 1937, Serial No. 135,342
In Germany April 6, 1936

7 Claims. (Cl. 280—112)

This invention relates to an automobile with front wheels which are independently sprung and guided parallel or approximately parallel to themselves, and rear wheels which are guided so as to be capable of tilting and which determine a longitudinal axis of inclination which rises obliquely from the front towards the rear.

In the known arrangements of this kind the effective tilting arm of the rear wheels does not vary in the whole springing range, so that the position of the longitudinal inclination axis, which rises from the front towards the rear, does not change with respect to the track. This has the drawback that with increasing transverse forces, especially when travelling round curves, the angle between the sprung vehicle mass and the restoring forces of the vehicle springs also increases. In this case the vehicle has no additional restoring forces which would reduce or entirely remove the effect of the transverse forces occurring in travelling round curves.

In contradistinction thereto the novelty of the invention consists in this, that the effective tilting arm of the rear wheels is positively decreased when travelling round curves, so that the point of rotation determined by the rear wheel guiding moves upwards with respect to the track. In this case the obliquity of the longitudinal inclination axis is reduced to the extent to which the transverse forces tend to cause the sprung masses to be inclined, which has the result that the vehicle lies firmly on the road, even when travelling round curves. The effective lever arm of the transverse forces becomes reduced or enlarged to the extent to which the rear wheels yield under the action of such transverse forces, according to whether the height of the point of rotation is smaller than that of the centre of gravity or vice versa. In the first case the transverse force moment acting upon the rear axle becomes smaller, so that it no longer assists the inclination movement of the sprung masses, while in the second case the transverse force moment acting upon the rear axle changes its direction, so that it opposes the transverse force moment acting upon the front axle. On account of the positive shortening of the effective tilting arm of the rear wheels, there is a tendency to restore the vehicle to an upright position, which in a very simple manner suppresses the unavoidable inclinations of the vehicle body.

The arrangement according to the invention is illustrated by way of example in the accompanying drawing.

Figure 1:
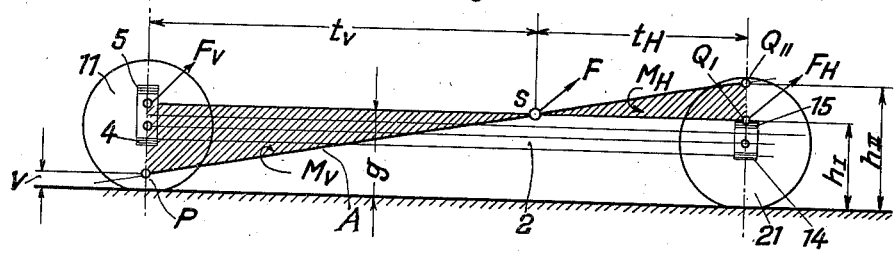
Fig. 1 is a diagrammatic side elevation of the chassis.
Figure 2:
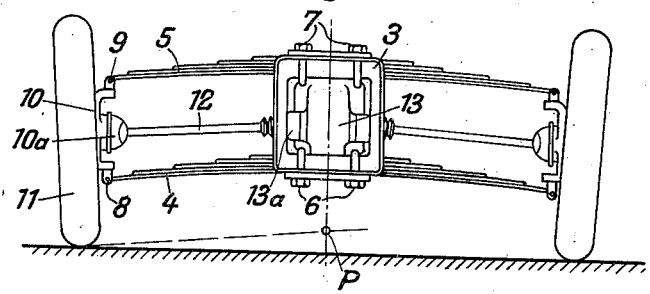
Fig. 2 is a corresponding front elevation.
Figure 3:
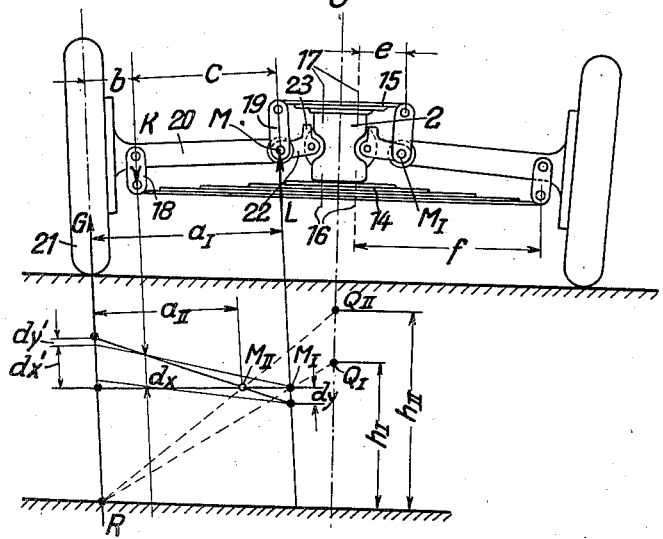
Fig. 3 is a corresponding rear elevation, each on a larger scale.

On the frame 2, constructed in the form of a longitudinal central frame member, there is secured at the front a ring-shaped spring-supporting member 3, to which two superposed transverse leaf springs 4, 5 are secured by means of stirrups 6, 7. The ends of the leaf springs 4, 5 are pivoted at 8, 9 to the stub axle carrier 10 on which the wheel 11 is mounted in the usual manner. The wheel 11 is driven by means of a transverse articulated shaft 12, the inner joint 13a of which is mounted laterally on the axle casing 13, and the outer joint 10a of which is mounted in a recess on the stub axle carrier 10. The transverse leaf springs 4, 5 are cambered upwardly somewhat so that the wheel 11 has a small cant. The point of rotation P of this parallel guiding arrangement lies somewhat above the track.

At the rear two transverse leaf springs 14, 15 are secured to the frame 2 by means of stirrups 16, 17. The lower longer leaf spring 14 is secured by links 18 to the outer end of a half axle 20, and the upper shorter leaf spring 15 is connected by a link 19 to the inner end of the half axle 20, the wheel 21 being mounted in the usual manner on the half axle. The inner end of the half axle 20 is pivoted at M to a link 22, which is pivotally mounted in a lateral recess in the frame 2. The link 22 has a stop 23 bearing against the frame 2. The leaf springs 14, 15 are extended so that the half axle 20 has a slight cant.

The bearing pressure G of the rear wheel 21 is balanced by the spring forces K, L corresponding to the lever ratio $b:c$. The arm $e$ of the upper leaf spring 15 is thereby bent downwardly and the arm $f$ of the lower leaf spring 14 is bent upwardly. In the position illustrated corresponding to the normal position of the vehicle, the stop 23 bears against the frame 2; the link 19, and consequently the centre of oscillation $M_I$, are in this case fixed with respect to the frame 2. This position of the half axle 20 determines the point of rotation $Q_I$ which lies on the line connecting the point of contact R of the wheel with the centre of oscillation $M_I$. If the wheel 21 yields, the stop 23 of the link 22 moves away from the frame 2 and not only the spring 14 but also the spring 15 is stressed. If it is assumed that the link 18 yields through a small distance $dx$ and the link 19 moves through a small distance $dy$, the corresponding yield of the wheel will be $dx'+dy'$. The new position of the half axle 20 determines an imaginary centre of oscillation $M_{II}$ and this in turn fixes a new point of rotation $Q_{II}$, which is considerably higher than the point $Q_I$.

The distance above the ground $v$ of the front point of rotation P is only small as compared with the distance above the ground $g$ of the centre of gravity S owing to the parallel guiding; the part $F_v$ acting upon the front axle of the total centrifugal force F will therefore with the lever arm $g-v$ produce a transverse force moment which tends to incline the sprung masses towards the outer side of the curve. The ground distance $h_I$ of the rear point of rotation $Q_I$, on account of the swinging guiding is approximately equal to the ground distance $g$ of the centre of gravity S; the part $F_H$ acting upon the rear axle of the total centrifugal force F will produce no transverse force moment, since the lever arm is zero, so that the inclination of the sprung vehicle masses at this moment is determined only by the transverse force moment $F_v$ $(g-v)$ and by the restoring moments of the springs 4, 5, 14. On account of the inclination of the sprung masses, however, at the next instant the centre of oscillations $M_I$ of the half axle 20 yields towards the track, whereby the point of rotation is positively moved upwards from the position $Q_I$ to the position $Q_{II}$. By this means a rear transverse force moment $F_H$ $(h_{II}-g)$ is obtained which is oppositely directed to the front transverse force moment and reduces the inclination of the sprung vehicle masses. If the point of rotation is displaced to the height of the longitudinal inclination axis A passing through the centre of gravity S, the front transverse force moment will be compensated by the rear transverse force moment according to the equation $F_v$ $(g-v) = F_H$ $(h_{II}-g)$. The centrifugal force F, which is assumed to be acting at the centre of gravity S, in this case has no lever arm which could produce a moment, and for this reason the sprung vehicle mass remains in its position without applying any additional stress to the vehicle springs. It will now be seen that the raising of the point of rotation $Q_I$ above the height $g$ of the centre of gravity is equivalent to producing a restoring action, which keeps the vehicle practically free from inclination.

The stop 23 of the link 22 has the object of preventing deformation of the leaf spring 15 towards the side away from the track, so that the vehicle behaves, when the rear wheels 21 yield on both sides, that is when travelling in a straight line, in exactly the same manner as if the centre of oscillation M of the half axle 20 were fixed in the frame 2. Instead of the auxiliary leaf spring 15 and also for the main leaf springs 4, 5, 14, it would of course be possible to use other springs. Instead of the parallel guiding by means of transverse leaf springs 4, 5 and instead of the tilting guiding by means of swinging half axles 20, it is possible to use other guiding means, for example, suitably arranged link quadrilaterals, in which case care must naturally be taken that the law of movement of the guiding means corresponds to a parallel guiding at the front and a tilting guiding at the rear.

What I claim is:

1. In a motor vehicle, a frame, front wheels spring mounted independently upon the frame and guided approximately parallel to themselves, rear wheels, swinging half axles carrying said rear wheels, means mounting said half axles upon the frame and affording a variable center of oscillation whereby the effective tilting arm of the rear wheels is decreased to such an extent that when travelling round curves, the rear part of the vehicle tends to be inclined at a higher center of rotation.

2. An automobile according to claim 1, characterized in that the ends of the swinging half axles are additionally sprung in the direction towards the track.

3. A motor vehicle according to claim 1, characterized by a transverse leaf spring, the ends of the swinging half axles being connected to the ends of said transverse leaf spring.

4. A motor vehicle as claimed in claim 1 characterized in that the ends of the half axles opposite the rear wheels are guided by links pivotally mounted in the frame.

5. A motor vehicle as claimed in claim 1 characterized in that the ends of the half axles opposite the rear wheels are guided by links pivotally mounted in the frame, and stops for limiting the upward swinging of said links.

6. In a motor vehicle, a frame, front wheels spring mounted independently upon the frame and guided approximately parallel to themselves, rear wheels, swinging half axles carrying said wheels at their outer ends, independent springs carried by said frame, means connecting the ends of one spring to the half axles adjacent the outer ends thereof, means connecting the ends of the other spring with the half axles adjacent the inner ends thereof, and links connecting the frame with the inner ends of the half axles for guiding the latter.

7. In a motor vehicle, a frame, front wheels spring mounted independently upon the frame and guided approximately parallel to themselves, rear wheels, swinging half axles carrying said wheels at their outer ends, independent springs carried by said frame, means connecting the ends of one spring to the half axles adjacent the outer ends thereof, means connecting the ends of the other spring with the half axles adjacent the inner ends thereof, links connecting the frame with the inner ends of the half axles for guiding the latter, and means for limiting the swinging movement of said links in one direction with respect to said frame.

WALTER BOXAN.